A. A. GAZDA.
SYSTEM OF CONTROL.
APPLICATION FILED DEC. 8, 1917.
1,414,403.
Patented May 2, 1922.
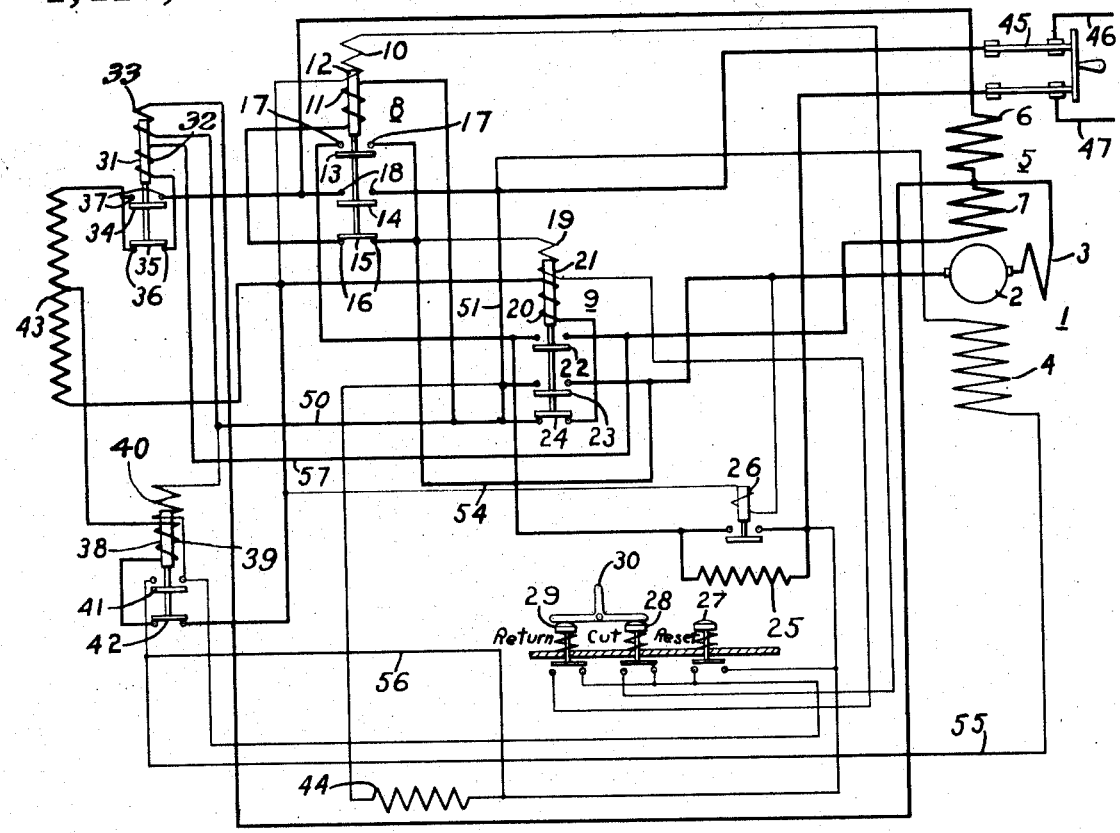
Fig. 1.
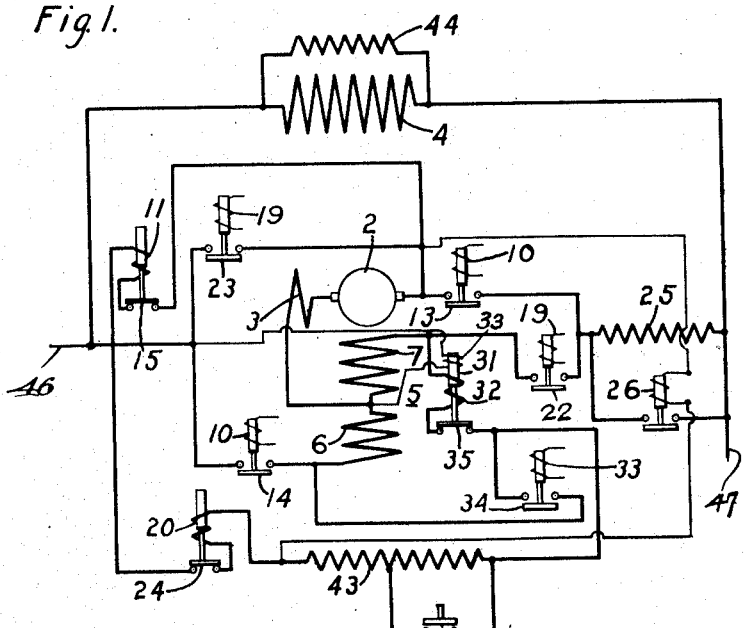
Fig. 3.
Fig. 2.
WITNESSES:
Olen E. Bee.
W. B. Wells
INVENTOR
Adolph A. Gazda.
BY
Wesley G. Carr
ATTORNEY

UNITED STATES PATENT OFFICE.

ADOLPH A. GAZDA, OF WILKINSBURG, PENNSYLVANIA, ASSIGNOR TO WESTINGHOUSE ELECTRIC & MANUFACTURING COMPANY, A CORPORATION OF PENNSYLVANIA.

SYSTEM OF CONTROL.

1,414,403.  Specification of Letters Patent.  Patented May 2, 1922.

Application filed December 8, 1917. Serial No. 206,140.

*To all whom it may concern:*

Be it known that I, ADOLPH A. GAZDA, a citizen of the United States, and a resident of Wilkinsburg, in the county of Allegheny and State of Pennsylvania, have invented a new and useful Improvement in Systems of Control, of which the following is a specification.

My invention relates to systems of control and particularly to systems of control for governing the operation of planers or machines which have similar cycles of operation.

One object of my invention is to provide a control system of the above-indicated character which shall be provided with a compound motor for operating the planer table in a forward and in a reverse direction and shall utilize the series field winding for effecting dynamic braking upon a failure of power.

In control systems of the above-indicated character which are now in service, it is customary to utilize the shunt field winding or the residual magnetism in the motor for maintaining the motor field during dynamic braking, upon a failure of power. However, in case the motor is operated at a very high rate of speed, the above methods are impractical for establishing a field sufficiently strong to brake the motor within a reasonable time. Accordingly, the control systems which utilize the shunt field winding or the residual magnetism of the motor for maintaining the flux during dynamic braking are impractical for commercial service when the motor is operating above a predetermined speed.

In a control system that is constructed in accordance with my invention, the motor is provided with a series field winding that is divided into two equal portions which are wound in opposite directions in order that a portion of the series field winding may be utilized for establishing a field for the motor during dynamic braking when there is a failure of power. When the motor is operating under normal conditions, one section of the series field winding is selected, according to the direction of rotation of the motor, for assisting the shunt field winding in establishing sufficient flux for operating the motor and, in case there is a failure of power, the one or the other of said series field winding portions are connected in series with the motor armature for effecting dynamic braking. Thus, by utilizing the series field winding during dynamic braking, the motor may be dynamically braked even if the same is operating at a relatively high rate of speed.

In the accompanying drawing, Fig. 1 is a diagrammatic view of a system of control constructed in accordance with my invention; Fig. 2 is a diagrammatic view of the main circuits passing through the motor, and Fig. 3 is a chart illustrating the sequence of operation of the various switches shown in Fig. 1.

Referring to the accompanying drawing, the control system embodies a motor 1 having an armature 2, a compensating winding 3, a shunt field winding 4 and a series field winding 5. The series field winding 5 is divided into two equal portions 6 and 7 which are wound in opposite directions.

Two switch mechanisms 8 and 9 are provided for controlling the direction of rotation of the motor 1. The switch mechanism 8 embodies two coils 10 and 11, the former of which is adapted to operate a core member 12 to one position and the other to maintain the core member in another position, and three switch members 13, 14 and 15. The switch member 15 is adapted to bridge contact terminals 16 when the switch is in the released or lower position, and the switch members 13 and 14 are respectively adapted to bridge contact members 17 and 18 when the switch is in an operative or upper position. The switch mechanism 9 embodies two coils 19 and 20, which are adapted to control a core member 21 in a manner similar to that in which the coils 10 and 11 control the core member 12, and three switch members 22, 23 and 24. The switch member 24 is adapted to complete a circuit when the switch mechanism 9 is in the released position and the switch members 22 and 23 are adapted to complete circuits when the switch mechanism 9 is in an operative position.

A resistor 25, which is controlled by a switch 26, is provided for governing the acceleration of the motor 1. Three push buttons 27, 28 and 29 are respectively provided for governing the resetting of the system and the cutting and the return stroke of the planer table. A pivotally mounted lever 30 is provided for operating the push buttons 29 and 28 in case it is desired to effect automatic operation of the planer by means of dogs mounted upon the planer table (not shown).

A switch mechanism 31, which embodies energizing coils 32 and 33 and switch members 34 and 35, is provided for ensuring that the flux established by the series field winding 5 shall assist the flux produced by the shunt field winding 4 in exciting the motor 1. In the released position of the switch mechanism 31, the switch member 35 is adapted to bridge contact terminals 36, and, in the operative position of the switch mechanism 31, the switch member 34 is adapted to bridge contact terminals 37. The coils 33 and 32 are wound in opposite directions, the former being adapted to operate the core member of the switch mechanism 31 and the latter to maintain the core member in its unactuated position. A no-voltage relay 38. which is provided with energizing coils 39 and 40 and switch members 41 and 42, is provided for short-circuiting a portion of a resistor 43, which is utilized during dynamic braking, and for closing certain control circuits when the reset push button 27 is operated. In the released position of the switch mechanism 38, the switch member 42 is adapted to complete a circuit and, in the operative position of the switch, the switch member 41 is adapted to complete a circuit. A resistor 44 is connected in shunt to the shunt field winding 4 for disposing of the inductive discharges therefrom. A two-pole switch 45 is provided for connecting the control system to the positive and negative supply conductors 46 and 47.

Assuming the system to be in the position illustrated in the drawing, the same may be operated by first closing the switch 45, operating the reset button 27 and then operating the push button 28 or 29, according to the position of the planer table. Considering the planer table to be at the end of its return stroke, the reset button is operated to complete a circuit from the negative supply conductor 47, through the switch 45, push button 27, coil 40 of the relay 38, conductor 50, conductor 51, and the switch 45, to the negative supply conductor 46. The switch mechanism 38 is operated and a holding circuit is established for the coil 40 from the negative supply conductor 47, through the switch 45, conductor 56, switch member 41, coil 40, conductors 50 and 51, and the switch 45, to the positive supply conductor 46. The cutting push button 28 is then operated and a circuit is completed from the switch member 41 through the push button 28, coil 10 of the switch mechanism 8, coil 20 of the switch mechanism 9, switch member 24, conductor 51, and the switch 45 to the positive supply conductor 46. The switch mechanism 8 is thus operated to disengage the switch member 15 from the contact terminals 16 and to bridge the contact terminals 17 and 18 by means of the switch members 13 and 14. The coil 20 of the switch mechanism 9, which is energized in series with the coil 10 of the switch mechanism 8, maintains the switch mechanism 9 in its lower position.

The switch members 13 and 14 of the switch mechanism 8 complete a circuit through the motor 1 from the negative supply conductor 47 through the switch 45, resistor 25, contact terminals 17—which are bridged by the switch member 13—conductor 54, armature 2, compensating winding 3, portion 6 of the series winding 5, contact terminals 18—which are bridged by the switch member 14—and the switch 45, to the positive supply conductor 46. A circuit is also completed from the positive supply conductor 46, through the switch 45, shunt field winding 4, conductors 55 and 56, and the switch 45, to the negative supply conductor 47. The motor 1 is thus operated in a forward direction and is excited by the shunt field winding 4 and the portion 6 of the series field winding 5. When the motor has reached a predetermined speed and has developed sufficient counter-electromotive force for operating the switch 26, the resistor 25 is shunted from the circuit of the motor.

When the planer table has reached the end of the cutting stroke, the lever 30 is operated to release the cutting push button 28 and operate the return push button 29. The energizing circuit for the switch mechanism 8 is open when the push button 28 is released and an energizing circuit for the switch mechanism 9 is completed when the push button 29 is operated. Intermediate the release of the push button 28 and the operation of the push button 29, a dynamic braking circuit for the motor 1 is completed from one terminal of the armature 2, through the compensating field winding 3, portion 7 of the series field winding 5, conductor 57, coil 32 of the switch mechanism 31, contact terminals 36—which are bridged by the switch member 35—resistor 43, coil 20 of the switch mechanism 9, switch member 24, coil 11 of the switch mechanism 8, contact terminals 16—which are bridged by the switch member 15—and conductor 54, to the other terminal of the armature 2. The coil 32 serves to aid the force of gravity in maintaining the core member 31 in its lower position. It will be noted that the no-voltage switch mechanism 38 is maintained in an operative position by means of the energizing coil 40 to prevent the short circuiting of any portion of the resistor 43 by means of the switch member 42.

The switch mechanism 9, when operated by the push button 29, completes a circuit through the motor 1 from the positive supply conductor 46, through the switch 45, switch member 23, armature 2, compensating winding 3, portion 7 of the series field winding 5, switch member 22, resistor 25 and the switch 45, to the negative supply conductor 47. The motor is now excited by means of the shunt field winding 4 and the portion 7 of the series field winding 5, and the current flow through the armature 2 is reversed so as to reverse the direction of rotation of the motor. When the motor has developed a predetermined speed, the switch 26 is operated, as before set forth, in order to short circuit the resistor 25 and further accelerate the motor.

When the planer table has reached the end of the return stroke, the lever 30 is operated to release the return push button 29 and to operate the cutting push button 28. Thus, the switch mechanism 8 is again operated and the switch mechanism 9 is released. Intermediate the operation of the switch mechanism 9 and the release of the switch mechanism 8, a dynamic braking circuit is completed from one terminal of the armature 2, through the compensating winding 3, portion 6 of the series field winding 5, contact terminals 37—which are bridged by the switch member 34—resistor 43, coil 20 of the switch mechanism 9, switch member 24, coil 11 of the switch mechanism 8, contact terminals 16—which are bridged by the switch member 15—and conductor 54, to the other terminal of the armature 2. It will be noted that the coil 33 of the switch mechanism 31 is connected across the armature 2, during the return stroke, in order to bridge the contact terminals 37 by means of the switch member 34 and thus complete the braking circuit above set forth. During the cutting stroke, the coil 33 of the switch 31 is connected across one portion only of the series field winding 5 and, accordingly, does not receive sufficient energy for operating the switch mechanism 31. The coil 33 is always energized by the counter-electromotive force of the motor during dynamic braking, so that it will maintain the core 31 in actuated position, but it is not sufficiently energized to effect the actuation of the core 31 in the first instance. Accordingly, at the end of the cutting stroke, the switch member 35 bridges the contact terminals 36 to complete the dynamic braking circuit at the end of the cutting stroke.

Assuming that the motor is operating the planer on a cutting stroke when there is a failure of power, the no-voltage relay 38 is released and a dynamic braking circuit for the motor 1 is completed through a portion of the resistor 43. The dynamic breaking circuit is completed from one terminal of the armature 2, through the compensating winding 3, portion 7 of the series winding 5, conductor 57, coil 32 of the switch mechanism 31, contact terminals 36—which are bridged by the switch member 35—the upper portion of the resistor 43, coil 39 of the no-voltage relay 38, switch member 42, coil 20 of the switch mechanism 9, switch member 24, coil 11 of the switch mechanism 8, contact terminals 16—which are bridged by the switch member 15—and the conductor 54, to the other terminal of the armature 2. A similar circuit may be established through the portion 6 of the winding 5 when there is failure of power during the return stroke. The coil 39 aids the force of gravity to maintain the relay 38 in its unactuated position. It will be noted that, upon a failure of power, the shunt field winding 4 is de-energized and, accordingly, the motor, during dynamic braking, is energized solely by one portion of the series field winding 5. In order to increase the excitation of the motor during dynamic braking, upon a failure of power, the no-voltage relay 38 is connected across the line circuit to be released for short circuiting a portion of the resistor 43 upon a failure of power, so as to increase the current flowing through the series field winding.

From the above description, it will be noted that, during normal operation of the motor 1, the motor is excited by means of the shunt field winding 4 and one portion of the series field winding 5 and that, during dynamic braking, when the power is maintained, the motor is energized not only by a portion of the series field winding but also by the shunt field winding 4, and a dynamic braking circuit is completed through the whole of the resistor 43. However, upon a failure of power, the shunt field winding 4 is de-energized and the motor is energized solely by one portion of the series field winding 5 and, accordingly, a portion of the braking resistor 43 is short circuited to increase the current flowing through the braking circuit.

Modifications in the system and arrangement and location of parts may be made within the spirit and scope of my invention and such modifications are intended to be covered by the appended claims.

I claim as my invention:

1. In a system of control, a motor having an armature and a divided series field winding having two portions, a resistor adapted to be connected in circuit with either of said portions, and means for completing a circuit through the armature, the resistor and one of said portions to effect dynamic braking, and means for varying the effective portion of said resistor in case of failure of power.

2. In a system of control, the combination with a motor having an armature and a divided series field winding, and means for selectively energizing portions of the series field winding to operate the motor in a forward and in a reverse direction, of a resistor, and means for completing a circuit through the armature, the resistor, and one or the other of said portions of the series field winding to effect dynamic braking, and means for varying the effective portion of said resistor in case of failure of power.

3. The combination with an electric motor having a shunt field-magnet winding and two series field-magnet windings and a dynamic-braking circuit for said motor comprising a resistor and the one or the other of said series field-magnet windings, of an additional dynamic-braking circuit comprising a portion only of said resistor and one of said series field-magnet windings, and means for energizing said circuits under normal and emergency conditions, respectively, and for effecting the energizing and the de-energizing of said shunt field-magnet winding under the respective conditions.

4. The combination with an electric motor having two series field-magnet windings and having, also, a resistor associated therewith, a pair of reversing switches for said motor having operative and inoperative positions, and a no-voltage relay for controlling said reversing switches and having an operative position and an inoperative position, of means for establishing a dynamic-braking circuit for said motor through the one or the other of said field-magnet windings, said resistor and said reversing switches when said reversing switches occupy said inoperative positions, and means for establishing a dynamic-braking circuit for said motor through one of said field-magnet windings, a portion only of said resistor and said no-voltage relay when said relay occupies its inoperative position.

5. The combination with an electric motor having an armature and a pair of series field-magnet windings, of a pair of reversing switches for said motor having inoperative positions in which they control a pair of dynamic-braking circuits for said motor each comprising one of said windings, and a two-position switch for establishing one of said dynamic-braking circuits in one of its two positions and the other of said dynamic-braking circuits in its other position.

6. The combination with an electric motor having an armature and a resistor in series therewith, of a pair of series field-magnet windings, and a switch for short-circuiting said resistor having an actuating coil connected across said armature and the one or the other of said windings.

7. In a system of control, the combination with a motor having an armature and a series field winding which is divided into two equal portions and means for selectively connecting the armature in series with said field-winding portions to operate the motor in a forward and in a reverse direction, of a resistor, means for connecting the resistor in series with the armature and a selected portion of said series winding in order to effect dynamic braking, and means for short-circuiting a portion of said resistor during dynamic braking, upon a failure of power.

In testimony whereof, I have hereunto subscribed my name this 28th day of Nov., 1917.

ADOLPH A. GAZDA